United States Patent
Wang et al.

(10) Patent No.: US 6,396,683 B1
(45) Date of Patent: May 28, 2002

(54) NOTEBOOK COMPUTER WITH EXCHANGEABLE LCD UNIT

(75) Inventors: Shih-Hsuan Wang; Chih-Cheng Tsen; Chun-Huang Lee, all of Taipei (TW)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 09/754,372

(22) Filed: Jan. 5, 2001

(51) Int. Cl.[7] ................................................. G06F 1/16
(52) U.S. Cl. .................... 361/681; 312/223.1; 248/917; 174/260
(58) Field of Search ................................ 361/681, 682, 361/695; 248/917–923; 345/169, 905; 312/223.1–223.6, 223.7, 223.2; 174/260–261; 205/305, 320

(56) References Cited

U.S. PATENT DOCUMENTS 5,193,069 A * 3/1993 Furuya ........................ 364/708
5,694,294 A * 12/1997 Ohashi et al. ............... 361/687
6,118,654 A * 9/2000 Bhatia ......................... 361/687

* cited by examiner

Primary Examiner—Leo P. Picard
Assistant Examiner—Hung Van Duong
(74) Attorney, Agent, or Firm—Birch, Stewart, Kolasch & Birch, LLP

(57) ABSTRACT

A notebook computer with exchangeable LCD (liquid crystal display) unit is provided. The notebook computer makes use of a connector secured to the bottom of the LCD unit by fixing to a printed circuit board which is electrically coupled to the LCD unit and an LCD energy converter, engagement members secured to hinges of LCD unit for coupling the LCD unit and the body together, a bracket extended from one end of one engagement member for securing to the printed circuit board, and a receptacle on the body engaged with the connector. This eliminates the wiring process of prior art, resulting in a reduction of assembly time. Also, this makes a replacement of different size LCD unit possible.

6 Claims, 5 Drawing Sheets

NOTEBOOK COMPUTER WITH EXCHANGEABLE LCD UNIT

BACKGROUND OF THE INVENTION

1. Field of Invention

The present invention relates to the field of notebook computer and more particularly to a notebook computer with exchangeable LCD unit such that a replacement of different size LCD unit is made possible.

2. Related Art

The operating principle of a liquid crystal display (LCD) is that the direction of a rod-shaped crystal molecule is subject to change by a current applied thereon. Typically, a LCD is incorporated in digital watch, notebook computer, or the like due to the low current consumption feature. Hence, LCDs are particularly suitable for long time showing. An attachment device for coupling a LCD unit 10 to the body 20 of a conventional notebook computer is shown in FIG. 1. The assembly process is detailed below. First couple one ends of cable 131 to screen 10 and LCD energy converter 11 respectively. Then pass both the other ends of cable 131 through a tube member on body 20. Next couple both the other ends of cable 131 to mainboard in the body 20 of notebook computer by soldering (in most cases). Body 20 and LCD unit 10 are coupled together by means of a pair of hinges 101. Hinge 101 has a pair of holes 1011 and 1012. As such, it is possible to drive a pair of screws 31 through hole 1011 and 1012 to secure LCD unit 10 to body 20. In view of above, such process is tedious and time consuming. Moreover, it is impossible to replace the screen with one with different size (e.g., larger one) in this configuration. Further, it is required to buy a new housing compatible with a larger screen to be installed. In an extreme case, user has to buy a new notebook computer if a replacement of a larger screen is desired. This is not economical, thus causing a great burden to user.

SUMMARY OF THE INVENTION

It is therefore an object of the present invention to provide a notebook computer with exchangeable LCD (liquid crystal display) unit. The notebook computer is advantageous for being easy in assembly. Also, a replacement of different size LCD unit is made possible.

The advantages of the present invention are realized by providing a notebook computer with exchangeable LCD unit. The notebook computer comprises a plurality of hinges on the LCD unit for securing the LCD unit to the body; a connector secured to the bottom of the LCD unit by fixing to a printed circuit board which is electrically coupled to the LCD unit and a LCD energy converter; a plurality of engagement members secured to the hinges for coupling the LCD unit and the body together; a bracket extended from one end of one of the engagement members for securing to the printed circuit board; and a receptacle on the body engaged with the connector. This eliminates the wiring process as experienced in the prior art, resulting in a reduction of assembly time and cost. Also, this makes a replacement of different size LCD unit possible.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become fully understood from the detailed description given hereinbelow illustration only, and thus are not limitative of the present invention, and wherein.

DETAILED DESCRIPTION OF THE INVENTION

Figure 1:
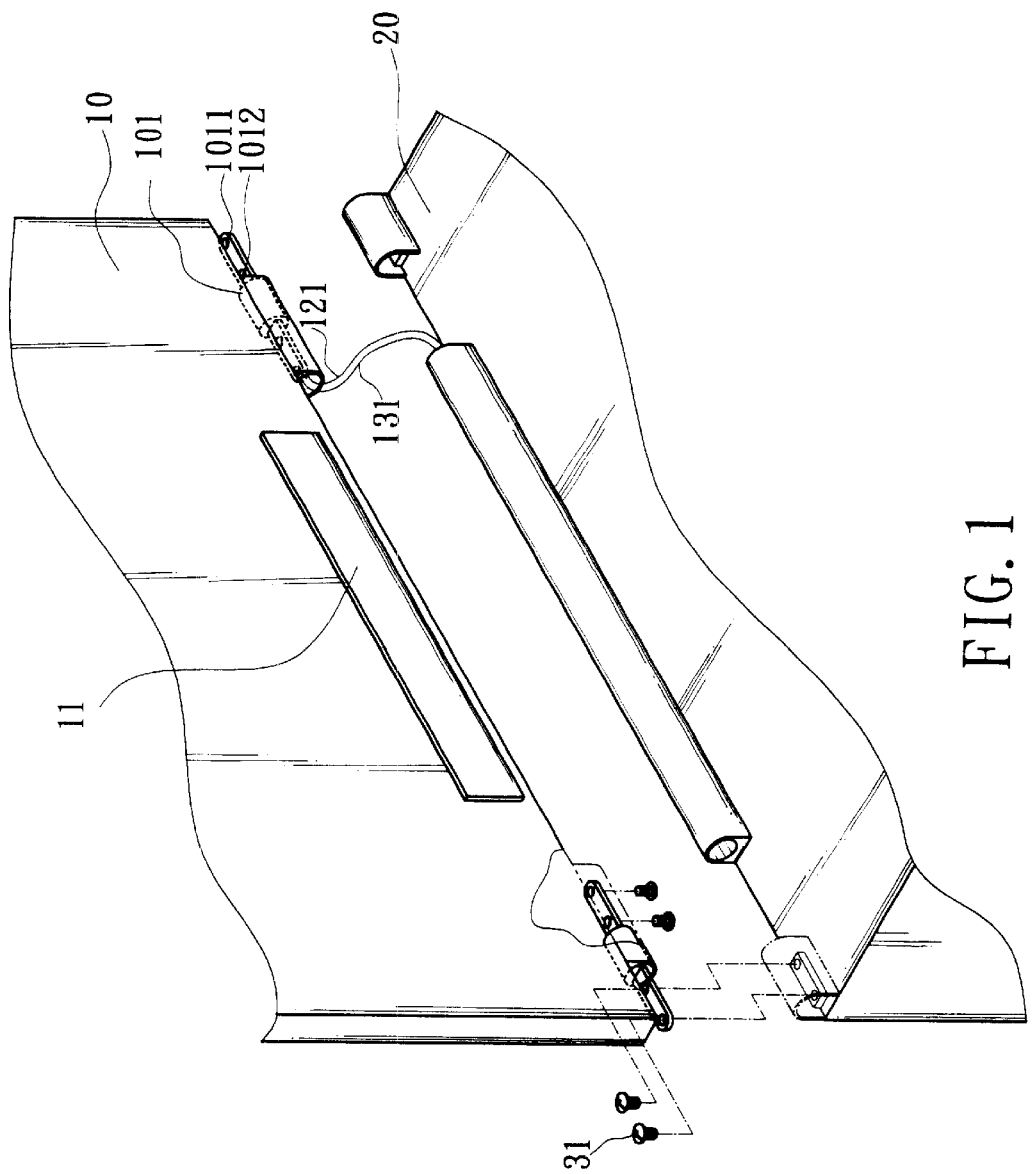
FIG. 1 is a partial exploded perspective view of a conventional notebook computer illustrating an attachment device for removable screen thereof.
Figure 2:
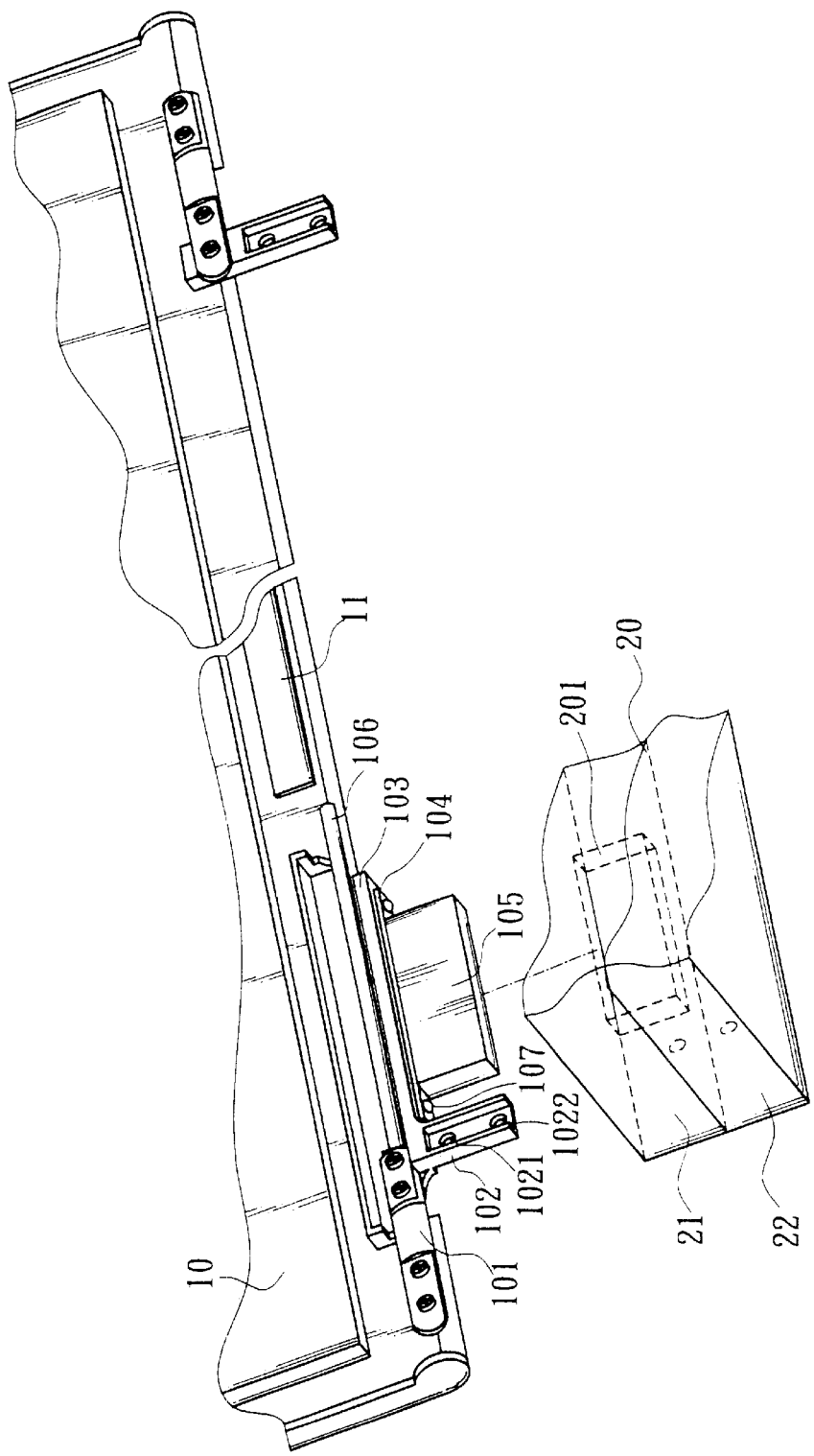
FIG. 2 is a perspective view schematically showing an attachment device for removable screen of notebook computer according to the invention.

Referring to FIG. 2, there is shown a LCD (liquid crystal display) unit 10 of notebook computer constructed in accordance with the invention. A connector 105 is fixed to a printed circuit board 104 by soldering. Printed circuit board 104 is placed the bottom of LCD unit 10. Then secure LCD unit 10 to body 20 of notebook computer by means of engagement members 102 secured to hinges 101. And body 20 includes all members, mainboard, VGA card, case, CPU etc., except screen to form a notebook computer. A bracket 103 is extended from one end of one engagement member 102 for engaging with connector 105. Printed circuit board 104 is electrically coupled to LCD unit 10 and LCD energy converter 11 by means of a flexible circuit board 106. Connector 105 is capable of engaging with a receptacle 201 on body 20 of notebook computer. This eliminates the wiring process as experienced in the prior art, resulting in a reduction of assembly time and cost. Also, this makes a replacement of different size LCD unit possible.

Flexible circuit board 106 is piece-like member. Flexible circuit board 106 is capable of flexibly forming as a roll or an S for ease of being received. Flexible circuit board 106 is coupled to LCD unit 10 and LCD energy converter 11 respectively. Flexible circuit board 106 is also coupled to printed circuit board 104 by means of layout of wiring. Preferably, a number of pins are reserved in connector 105 for future expansion such as for the purpose of bluetooth. Preferably, the circuit board 106 is enclosed by a durable material such as PVC for prolonging the useful life thereof.

Figure 3:
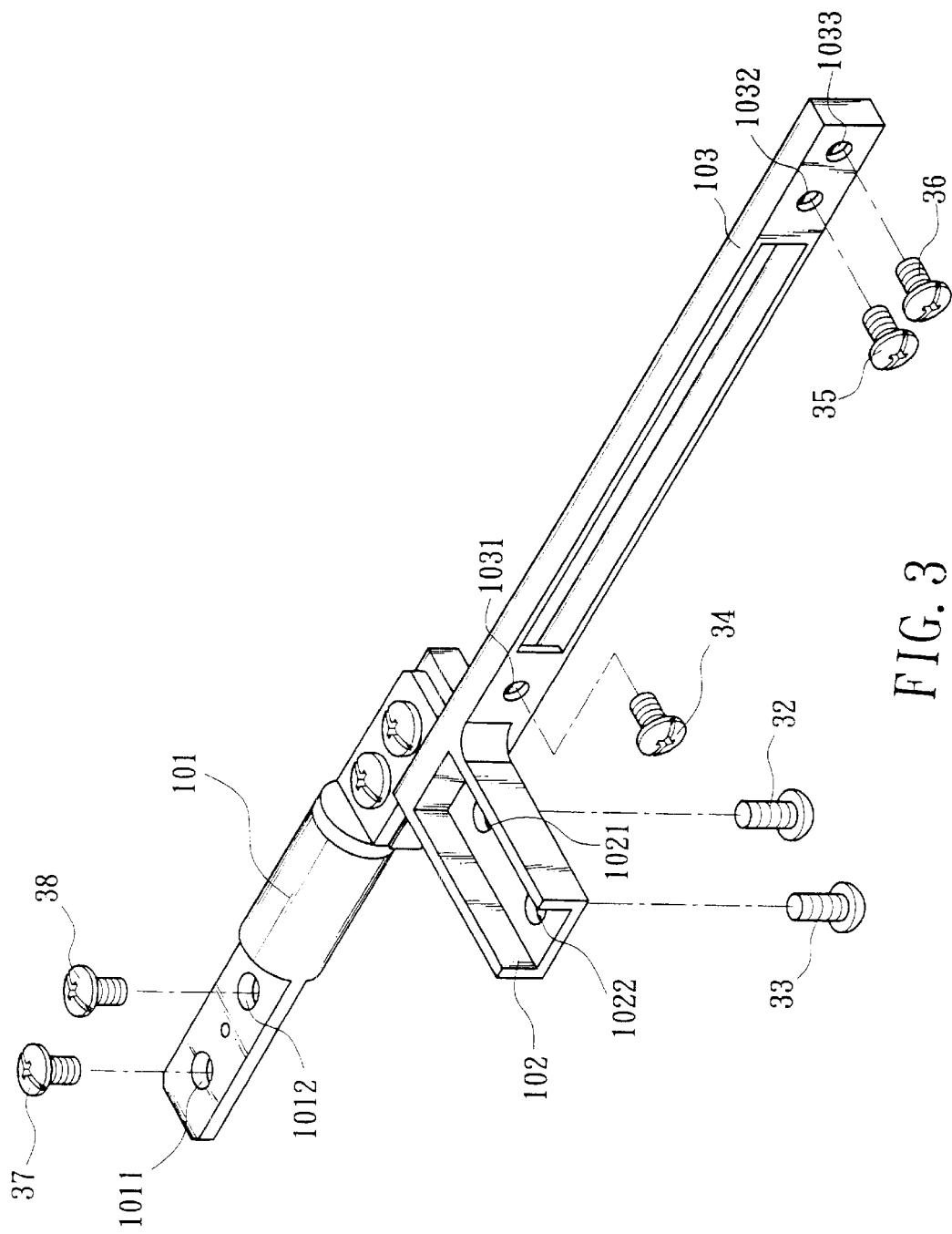
FIG. 3 is a perspective view of bracket shown in FIG. 2.

After connector 105 is soldered to printed circuit board 104, screws 34 and 35 are driven through holes 1031 and 1032 respectively to secure both connector 105 and printed circuit board 104 to bracket 103. Referring to FIG. 3, secure hinges 101, engagement members 102, and brackets 103 to LCD unit 10 by driving screws 37, 38, and 36 through holes 1011, 1012, and 1033 respectively. Body 20 of notebook computer consists of an upper housing 21 and a lower housing 22 (see FIG. 2). Screw 32 is driven through hole 1021 to secure to upper housing 21. Screw 33 is driven through hole 1022 to secure to lower housing 22. Thus this attachment ensures a securing of LCD unit 10 to body 20.

Figure 4:
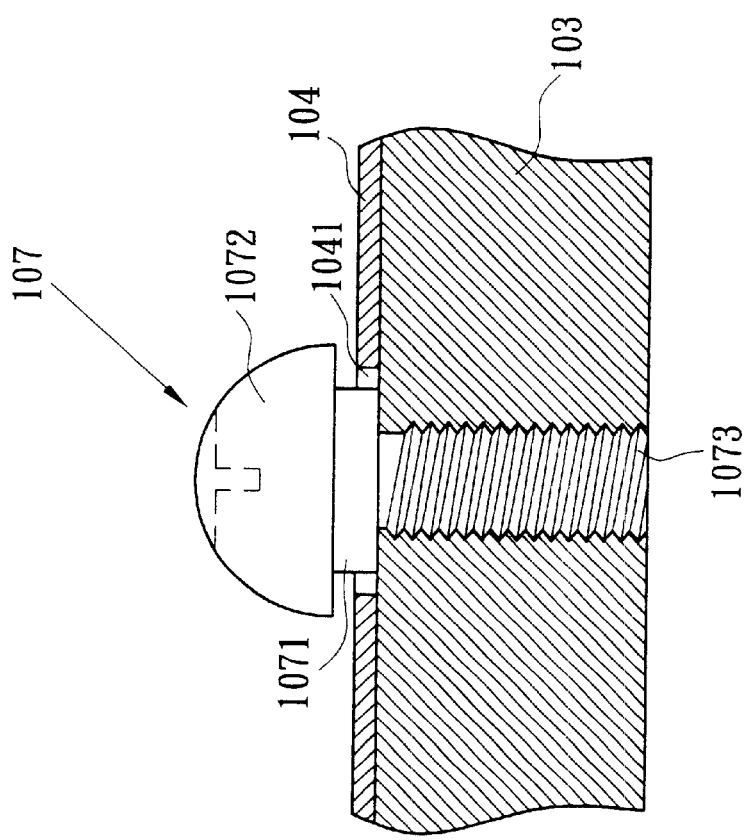
FIG. 4 is a cross-sectional view showing the securing of bracket and printed circuit board by screw of FIG. 2.

Referring to FIG. 4, two fixing screws 107 are driven through printed circuit board 104 and holes 1031 and 1032 to secure to bracket 103. Fixing screw 107 has a projection 1071 between head 1072 and screw thread portion 1073 on the shank. The diameter of projection 1071 is smaller than that of head 1072 but larger than that of screw thread portion 1073. Also, the diameter of projection 1071 is slightly smaller than the diameter of hole 1041. As such, there is a desired tolerance between printed circuit board 104 and projection 1071 after fixing screw 107 is driven through. Further, the length of projection 1071 is slightly larger than the thickness of printed circuit board 104. Hence, there is a tolerance between the bottom of head 1072 and the top of printed circuit board 104 after fixing screw 107 is driven through. Such tolerances may permit a fine adjustment of printed circuit board 104 for compensating a minor misalignment between the engaged connector 105 and receptacle 201. Thus the installation of screen 10 is made possible.

Figure 5:
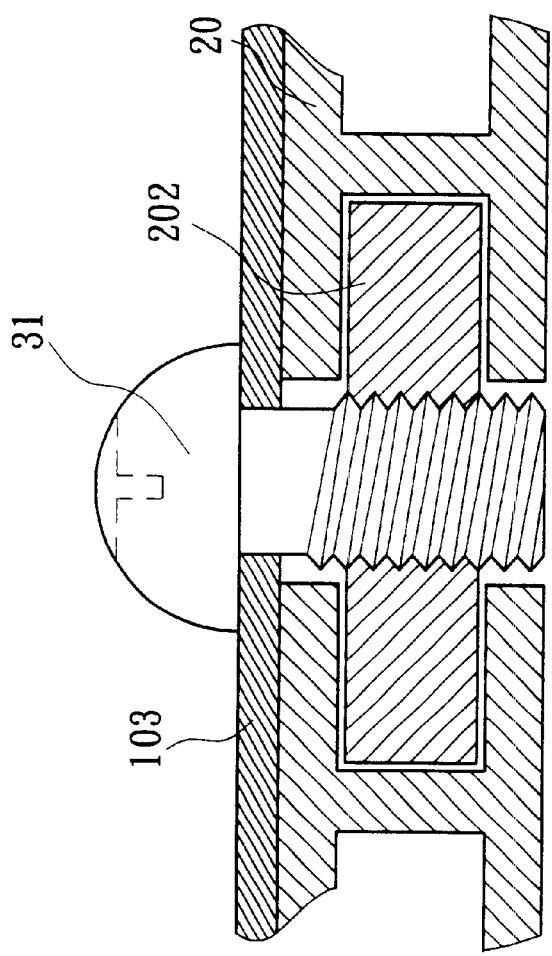
FIG. 5 is a view similar to FIG. 4 wherein a pad is provided in body of notebook computer for enhancing the securing of bracket and body by screw of FIG. 2.

Referring to FIG. 5, a pad (e.g., made of metal or the like) 202 is provided in body 20 of notebook computer for enhancing the securing of LCD unit 10 and body 20 by two screws 32,33 (as shown in FIG. 3). It is known that a notebook computer should be made as small as possible with respect to weight in order to be portable. Hence, upper housing 21 and lower housing 22 of body 20 of notebook computer is typically formed of lightweight plastic material or the like. This, however has a drawback of potential weakness in structural strength of notebook computer. This is the reason for the provision of pad 202.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A notebook computer with exchangeable LCD unit comprising:

a body;

a LCD unit using a plurality of hinges for securing to the body;

a connector secured to the bottom of the LCD unit by fixing to a printed circuit board which is electrically coupled to the LCD unit and a LCD unit energy converter by means of a flexible circuit board;

a plurality of engagement members secured to the hinges for coupling the LCD unit and the body together;

a bracket extended from one end of one of the engagement members for securing to the printed circuit board; and a receptacle on the body being engaged with the connector.

2. The notebook computer of claim 1, wherein the connector is soldered to the printed circuit board.

3. The notebook computer of claim 1, wherein the printed circuit board comprises at least two holes each being driven through by a fixing screw to secure the printed circuit board and the connector to the bracket, the fixing screw comprises a screw thread portion on the shank and a projection between the head of the fixing screw and the screw thread portion, the diameter of the projection is smaller than that of the head but larger than that of the screw thread portion, and the diameter of the projection is smaller than the diameter of the hole such that there is a tolerance between the printed circuit board and the projection after the connector is secured.

4. The notebook computer of claim 3, wherein the length of the projection is larger than the thickness of the printed circuit board such that there is a tolerance between the bottom of the head and the top of the printed circuit board after the connector is secured.

5. The notebook computer of claim 1, further comprising a durable material for enclosing the flexible circuit board.

6. The notebook computer of claim 1, further comprising a plurality of screws for securing the hinges to the body and a pad in the body being driven through by the screws.

* * * * *